May 2, 1939.　　　　　A. MADLÉ　　　　　2,157,066
POWER TRANSMISSION MECHANISM
Filed Aug. 23, 1933　　　2 Sheets-Sheet 1
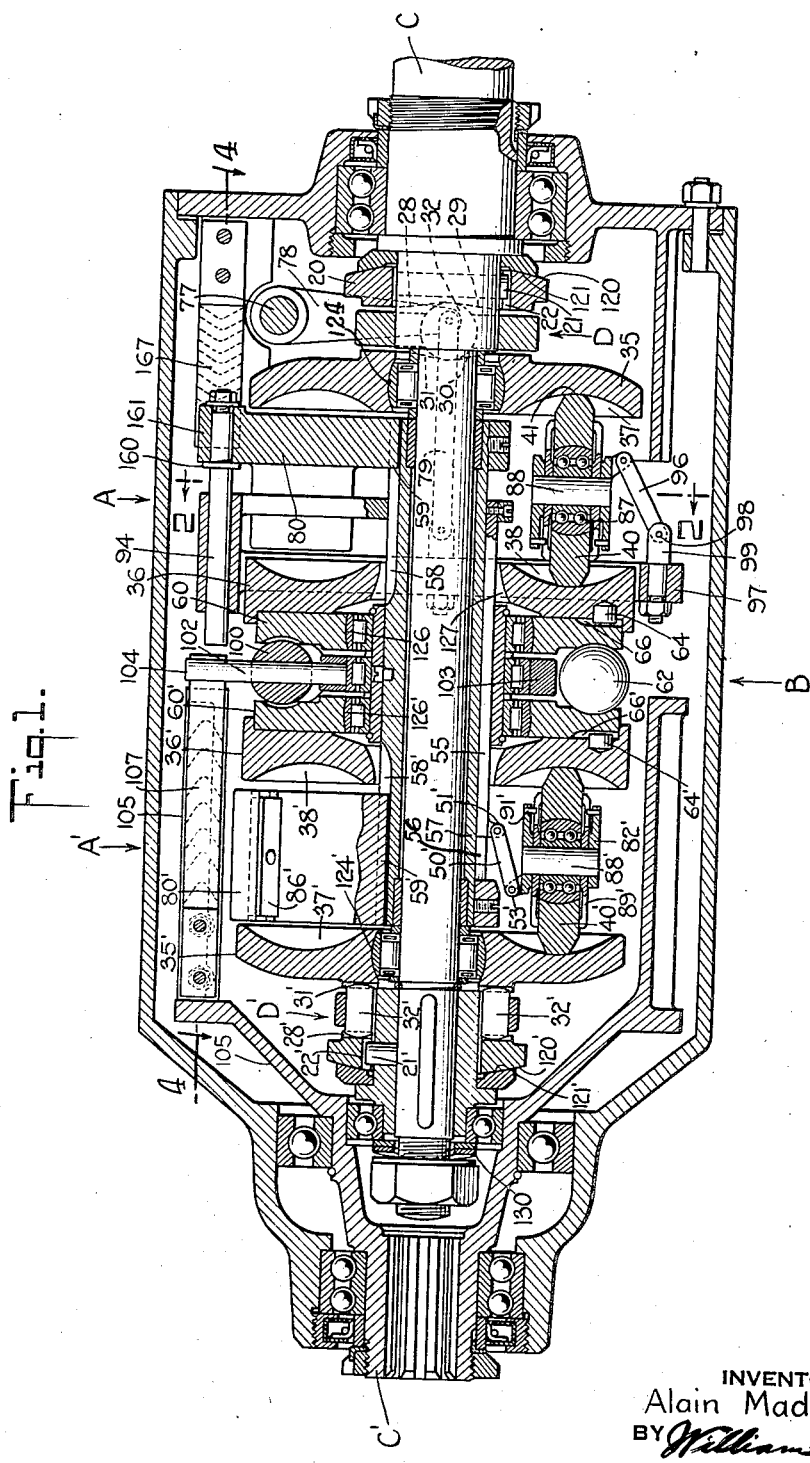
INVENTOR
Alain Madlé
BY *William S. Gluck*
ATTORNEY May 2, 1939.                A. MADLÉ                      2,157,066
                    POWER TRANSMISSION MECHANISM
                       Filed Aug. 23, 1933        2 Sheets-Sheet 2
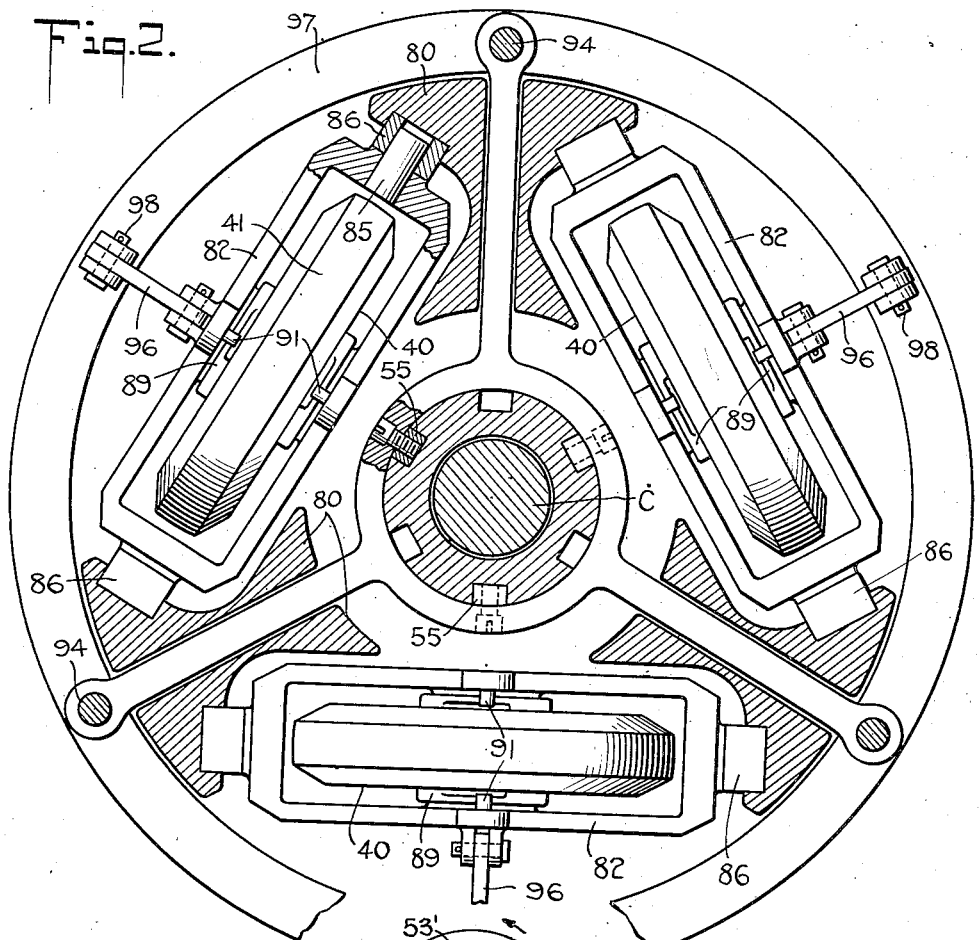
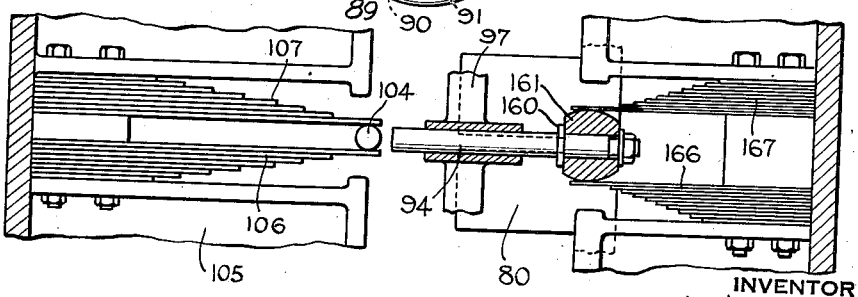
INVENTOR
Alain Madlé
BY
William S. Gluck
ATTORNEY Patented May 2, 1939

2,157,066

UNITED STATES PATENT OFFICE 2,157,066

POWER TRANSMISSION MECHANISM

Alain Madlé, Bristol, Conn., assignor, by mesne assignments, to Mildred S. Reisman, New York, N. Y.

Application August 23, 1933, Serial No. 686,350

36 Claims. (Cl. 74—285)

This invention relates generally to a power transmission in which the drive is by adhesive contact and more particularly to this type of transmission wherein the power is transmitted from one torque-transmitting member to another through power branches.

I have herein illustrated a type of transmission employing two power branches as representing a fundamental type, it being understood that the increase of power branches beyond two is merely a multiplication of power branches and will be governed more or less by the principles herein set forth.

The specific embodiment herein illustrated shows a transmission with equivalent power branches and where the junction of the branches is rigid. Such a transmission will function to transmit efficiently only to the extent to which the speed ratios of the two power branches are identically the same.

Manufacturing requirements make it almost impossible to attain this merely by precision of the parts, and it is therefore one of the objects of my invention to provide in connection with such a system, an arrangement whereby any variations that may exist or develop in the ratios of the power branches where they are united, will not reduce the efficiency of transmission.

This arrangement comprises generally the interposition in the path of transmission common to both power branches, as for example, at the point where the power divides or where it unites, of a transmission means fully responsive to the ratio of transmission of each, and in the illustrated embodiment such fully responsive means take the form of an assembly having rolling bodies in adhesive driving relation with both branch power systems. With such an arrangement, the efficiency of the transmission is maintained unimpaired, because the rolling bodies will establish a ratio which is the average of the individual ratios existing in the two power branches.

In the embodiment of my invention herein illustrated, I show my branch power arrangement as including means for varying the ratio of transmission between the driving and the driven end, and such means comprises generally means for changing the leverage between the parts, and where, as in the illustrated embodiment, it is contemplated that the speed ratios shall be approximately the same through both power branches, I show in such embodiment controlling means as functioning in both systems to maintain the ratios approximately the same.

Where the input power is transmitted first to the interposed rolling body assembly, then the power is divided through and transmitted to the branch power lines by such interposed assembly. Where the power is transmitted to the branch power lines, and then to the interposed assembly, the interposed assembly will serve to unite the branch power lines. In the former case the interposed assembly is the driving end, and in the latter, the driven end. In other words, the arrangement is reversible, the direction of power flow merely determining whether the power is divided or united by the interposed planetary system.

Instead of the system being devised for the purposes of transmitting at the same ratio with the interposed rolling body assembly serving to accommodate undesired differences in the speed ratios through the power branches which arise from and are incidental to such a system as above outlined, my invention further contemplates that the speed ratios through the power branches be made purposefully different. Such an arrangement will give in effect what is a speed reduction, the speed ratio at the output end being the average of the ratios through the power branches, and the speed reduction can be made continuously variable by making the speed ratio through one of the systems continuously variable or by making the speed ratios through both of the systems continuously and independently variable. By such an arrangement a speed reduction is attainable which is continuously variable through zero.

It is a general object of my invention to provide a new, simple and efficient arrangement for the transmission of power by split branches.

For the attainment of these objects and such other objects as may hereinafter appear or be pointed out, I have illustrated an embodiment of my invention in the drawings, wherein:

Figure 1 is a section longitudinally through my transmission;

Figure 2 is a section taken on line 2—2 of Figure 1;

Figure 3 is a side elevational view of a detail; and

Figure 4 is a section taken on line 4—4 of Figure 1.

Before proceeding to describe my invention, I will premise that the embodiment illustrated in the drawings is devised primarily for purposes of transmission through split power branches and that therefore the power branches are so related as to transmit at the same speed ratios and that the provision for varying this speed ratio, where employed, is of a character to maintain the speed ratios in both branches approximately the same.

Upon viewing Figure 1, where such arrangement is illustrated, it will be observed that I here show two torque-transmitting members C and C', and means for connecting the two, and that such means comprise generally the systems A and A', each being in driving connection with the shaft C, through the intermediary of one or the other of the torque-loading members D and D' associated therewith, and that there is interposed between the above-mentioned systems A and A', the system B, hereinafter to be referred to as the interposed system, and which in turn is in driving connection with the other torque-transmitting member C', in the manner that will be pointed out, and before proceeding to describe the details of this construction, I will premise that if the transmission of power is from the end C', where C' is the driving member, to the rolling bodies of the interposed system B, which through the races of that interposed system, splits the power thus transmitted and delivers the split branches to the systems A and A' respectively, the split branch powers being transmitted thereby to the driven shaft C.

Where, on the other hand the shaft C is the driving shaft, the power will be immediately split and the split branches transmitted through the systems A and A' to the interposed B, where the split power branches will be reunited and then transmitted to the driven shaft C'. However, whichever may be the driven end, the arrangement herein disclosed will serve this purpose generally in the same way, and therefore either shaft C or C' may be considered the driving shaft, in which event the other will be the driven shaft, but for the purpose of convenience of description only, the shaft C' will hereinafter be referred to as the driving shaft.

I have illustrated both A and A' as having their ratios of transmission continuously variable, and as substantial duplicates in all respects even to the arrangement for varying the speed ratios of each, and also as both transmitting at the same ratio, although it will be understood as the operation of the embodiment herein described is studied, that my invention does not require such exact duplication, and that it is one of the primary objects of my invention to permit a split branch power transmission to function efficiently even though there may be a variation in the ratios of the transmission in the split power branches.

In view of the fact, therefore, that I have illustrated them as exact duplicates, a description of one will suffice as a description of the other, and I therefore will describe the power transmission A at the right in Figure 1 by means of reference characters applied to the parts in the drawings, and have applied in the drawings, the same reference characters to the corresponding parts of the branch power transmission A' at the left, however, with each such reference character primed so that the description of the power transmission A at the right can be read also on the parts of the transmission A', at the left by the priming of the reference characters employed in such description. With this explanation, I will now proceed to describe the transmission of the power from the shaft C through the branch transmission A.

A pressure member 20 shown as a disc or ring mounted about the shaft C is so associated with the shaft C as to be driven therewith and yet be adjustable with reference thereto, as, for example, by the protruding end 21 of a pin through the shaft C, which is freely received in the slot 22 formed in the bore of the pressure member 20. The pressure member 20 has its inner face formed with a plurality of pairs of inclined faces 28 and 29, arranged in opposition to and for cooperation with similar pairs of inclines 30 and 31, formed on the adjacent face of the race ring 35, of the system A. Rolling bodies 32 are received between each set of opposed pairs of inclined faces 28, 29 and 30, 31. These rolling bodies are shown in full lines in the system A', at the left of Figure 1 and in dotted lines in the system A at the right of Figure 1.

The system A comprises the races 35 and 36, each provided with a toric face 37 or 38 (hereinafter referred to as "race-ways"), positioned in symmetrical opposed relation and rolling bodies shown received therebetween. To permit of ratio variation, these rolling bodies are shown as in the form of rollers 40 and each provided with annular surface of contact 41, and before describing my arrangement for varying continuously the ratio of transmission of this system, I will premise that (1) the variation is attained by change of leverage between the elements of the system; (2) the change in leverage is attained by the tilting of the rollers, and (3) the tilting of the rollers is attained, first by an angling of the rollers about their points of adhesive contact with the races, and then by the action of the races upon the rollers as long as they remain angled, to give them a rolling movement to successively new positions of tilt until the desired change in tilt has been reached.

For this purpose, the rolling bodies take the form of rollers 40, the contacting surfaces 41 of which are generated specifically to permit these rollers to maintain a proper adhesive contact with the toric surfaces of the races as they are tilted and are, therefore, of a transverse radius not in excess of, and preferably smaller than, the transverse curvature of the toric faces 37 and 38, and the centers of the rollers are shown as in the locus or path of a circle that generates these toric surfaces.

Upon viewing Figures 1 and 3 of the drawings, it will be observed that rollers 40 are each carried in a frame 82 mounted for pivotal movement about an axis diametrical of the roller and perpendicular to the axis through the point of adhesive contact of each roller with the races, as by means of pins 85 about which the frame 82 swivels. The pins 85 in turn are mounted in sliding blocks 86 (see Figures 1 and 2) carried in guide-ways in the cage 80 so as to allow of a lateral adjustment of the roller carriers of both systems relatively to the other cage 80.

To impose upon the rollers the aforementioned angling movement so as to position each roller angularly of its normal path of travel, and thus permit the rotation of the races to translate the rollers to successively new positions as the races rotate, I employ an arrangement which comprises generally a universal support for each roller and means controlled by the tilting of the frames 82 to cause each roller to angle in that direction determined by the direction of tilting of the frame, and in Figures 1, 2 and 3, this universal support for each roller is attained by mounting it upon a self-aligning bearing 87 carried by the pin 88 which in turn is supported from the frame 82. In this manner, the roller 40 can assume any position relatively to the frame within the limits fixed by the design.

In Figures 2 and 3 is shown the arrangement by which an angling movement is given to the rollers by the frames 82. This arrangement comprises members 89 adjacent the rollers. These members are mounted intermediate their ends about the pins 88 of the rollers, each member being provided at its terminal ends with the inwardly directed projections 90 and 90' so arranged as to be closely adjacent to the faces of each roller. While the members 89 are free to swing about the pins 88, this swinging movement is limited to a movement of these members from their full line position shown in Figure 3 to the dotted line position shown in this figure, and this I accomplish by the provision of pins 91 carried by the frames 82 and presented in the path of swinging movement of the members 89.

The direction of movement of the frames 82 about the axis of the pins 85 will, therefore, determine which projection 90 or 90' of each member 89 is moved into contact with the roller, and the direction of the rolling movement of the roller will determine which of the two positions shown in Figure 3 the members 89 will assume.

The roller frames 82 and their attendant and associated parts are all supported from the roller carrier or cage 80 which bears about one of the rotating members C or C', as shown in Figure 1, and is held against rotation in the specific manner and for the added purposes to be hereinafter referred to, in any preferred or desired manner.

The frames 82 are moved angularly in any preferred or desired manner, as by control levers or links 96, which in turn are operated simultaneously and in unison by the regulating ring 97, to which each of the links 96 is connected as by a pivot 98 and a bolt 99 which is shown as fixedly associated with the ring 97. The ring 97 in turn is supported for rectilinear movement along the axis of the transmission in any preferred or desired manner, as for example, by the bolts 94 carried by and extending from the cage 80.

The rectilinear movement may be imparted to the controlling ring 97 in any preferred or desired manner.

In Figure 1, I have illustrated one arrangement for controlling the movement of the ring 97. This arrangement comprises the link 79 connected at one end to the ring 97 and at the other end to the free end of the lever 78 operated by the shaft 77 and which in turn may be operated in any preferred or desired manner.

It will be assumed that the roller 40 is rotating in the direction shown by the arrow in Figure 3, in which event the member 89 will be in a position shown in full lines in this figure, and any angular movement given to the frame 82 will cause the projection 90, or 90', as the case may be, to be moved into contact with the roller, to tilt the roller about an axis diametrically through the point of adhesive contact of the races therewith.

To provide a balanced turning movement for each roller by forces applied to opposite faces of the rollers, I duplicate the members 89 to each side of each roller so as to provide two such members for each roller. Upon any angling of the frame 82, the roller will be tilted through members 89 positioned to opposite sides thereof and acting together to angle the roller in the same direction and to the same extent.

If the frame 82 is moved angularly while the roller 40 is moving in the direction opposite to that shown by the arrow in Figure 3 the turning movement of the roller will occur exactly as above set forth and in a direction dependent upon the direction of the angular movement of the frame 82.

Upon a continued tilting of the frame 82 by the disc 97, the members 89 will move the roller angularly to increasing extents. Due to this change in its angular position, the roller will roll diagonally across the face of the races to change its tilt. The controlling member 97 is moved, as set forth, until a tilt of the rollers is reached to give the desired speed change. When the controlling disc stops moving, however, the rollers will continue to move diagonally and in such movement will move away from that pressure-applying projection 90 or 90' of each member 89 which has been causing it to angle and will move into contact with the pressure-applying projections on the members to the other side of the pins 88, and in such movement will act in connection with the projections on that side, in the same manner as it did in connection with the initiation of the angling movement to cause a restoration of the rollers to a position in the normal path of their travel.

Upon viewing Figures 1 and 2 of the drawings it will be observed that the arrangement shown in the drawings is such that any angling movement given to the rollers 40 of transmission system A will correspondingly affect the rollers 40' of transmission system A'. As the rollers of the two systems are shown as initially tilted to have the systems function at the same ratio of transmission, it will be understood of course, that this will remain approximately so throughout the changing ratios.

This arrangement comprises slides 55, mounted in grooves 56 in the bearing member 57, for free sliding axial movement relatively to shaft C, and groups of links 50' pivoted respectively between ears 51' and 53' of the slides 55 and the roller frames 82' of the transmission A'.

By this arrangement it will be observed that the two sets of links 96 and 50' are so associated that one set of links pushes while the other set pulls. As a result of this, the speed ratios will be changed simultaneously in both systems A and A' in the same direction and to approximately the same extent. Such an arrangement, while simple, will give only an approximation to the duplication of the speed ratio. The difference in speed ratios resulting from this factor will also have no effect upon the efficiency of the transmission for the reasons already given.

The interposed system B comprises the races 60 and 60' and the rolling bodies 62 received therebetween and the driving connection between the interposed system B and the split power systems A and A' is established through pins 64 and 64' carried by the branch power systems A and A', and received freely in the slots 66 and 66' formed in the race rings 60 and 60' of the interposed system B. The driving connection between the interposed system B and the shaft C' is herein illustrated as established by an arrangement that comprises annularly arranged spacer members 100 having spherical bearing surfaces for receiving the annularly arranged balls 62 therebetween, and which in turn are loosely carried by pins 102, projecting outwardly from member 103. The outwardly projecting ends 104 of the pins 102 are received between sets of packed leaf springs 106 and 107 fixed at their opposite end to the driving bell 105, shown as formed integrally with the shaft C'. It will therefore be observed that power from C' is transmitted through pins 102 to the spacer members 100 and thereby through balls 62 to races 60 and 60', which are provided with annular grooves to receive the balls in rolling frictional engagement. As long as the load on races 60 and 60' is balanced, there will be no relative motion between said races and balls, but if a state of unbalance exists, a slight relative motion takes place between races 60 and 60', which is permitted by balls 62, until equilibrium is again established.

At the right, in Figure 1, I show in connection with the roller carriage of transmission A, an arrangement whereby shocks or impacts from one end of the system are treated so as to prevent adverse effect on the adhesive system through that end, and this arrangement is in the form of means which do not develop an axial component.

It will be observed that the race rings 36 and 60 are associated together so as to move as a unit, as are also the associated race rings 36' and 60' and therefore could be formed in one piece.

Projecting upwardly from the carriage 80 of the system A are lugs 160 (three in number) bored so as to receive therethrough the bolts 94 which serve to guide the reciprocating ring 97 and provided with rounded sides. The lugs 160 are received between sets of packed springs 166 and 167 secured to the casing in any preferred or desired manner, as for example as shown in the drawings. These packed springs serve to receive and reduce the gradient of any impacts transmitted to the carriage 80.

A system of this character, depending as it does upon the application of pressure to a plurality of points of adhesive contact, will function efficiently only to the extent to which the pressures are distributed in balanced relation and I will now describe my arrangement for accomplishing this.

Pressure member 20, associated with the system A, is shown as supported for free movement with reference to the shaft C, and is held to spherical alignment by means of contacting spherical surfaces 120 and 121. The race ring 35 of this system is mounted for self-alignment by means of the associated spherical bearing surfaces generally referred to by the reference character 124. So, also the associated race rings 36 and 60 are mounted for spherical adjustment about the contacting spherical bearing surfaces referred to generally by the reference character 126, and for this purpose the race ring 36 is cut away as shown at 127. As already stated, the corresponding parts of the system A', are similarly mounted and related for self-alignment.

The roller carriages 80 and 80' are held in fixed and spaced relation on the tube or bearing member 57 and are held floatingly in a fixed position between the springs 166 and 167, as already explained. Owing to the mounting of the roller frame 82 within the blocks 86 and 86' the individual rollers, however, are free to move axially to adjust themselves in relation to the system.

The systems A and A' are maintained in assembled relation in any preferred or desired manner as for example by means of a spring washer 130 shown at the left in Figure 1.

In the absence of a provision thereagainst, or for compensation therefor, the following factors will affect the efficiency of the transmission by split power branches: (1) The manufacturing tolerances and inaccuracies as a result of which the transmission through two branches is not absolutely in balanced relation as to speed ratios. (2) Inaccuracies which develop as a result of wear and tear. (3) Vibrations which result from application of split powers to spaced points of an elongated transmission shaft as a result of which the application of power will fluctuate between the two branches and therefore an overload will be carried first by one branch and then by the other.

By the interposition between the planetaries of the split power branches of the rolling bodies provided by the third planetary, the efficiency of the transmission will not be reduced by any difference that may exist or develop between the speed ratios of the power branches because the interposed rolling bodies will be fully responsive to the speed ratio of each system and will transmit at a speed ratio which is the average of the two.

By so devising the speed ratios of the two power branch transmissions so that one is purposefully made to drive at a different speed ratio or in a different direction or both with reference to the other, the transmission becomes in fact a reduction drive, and by making the ratio of either one or the other or both of the systems continuously variable, the ratio of the reduction can also be varied and it will be understood that it is within the contemplation of broader phases of my invention that the transmission by split power branches be so applied.

Having thus described my invention and illustrated its use, what I claim as new and desire to secure by Letters Patent is:

1. A power transmission system for transferring power between a pair of torque-transmitting members, said system comprising a plurality of branches along which power may pass between said members, speed-balancing means interposed between said branches and one of said members, whereby the ratio between the speeds transmitted by the various branches will be predetermined, and resilient means in the path of the transmitted power and interposed between said speed-balancing means and the last-mentioned member for modifying the transmitted torques.

2. A power transmission system for transferring power between a pair of torque-transmitting members, said system comprising a plurality of branches along which power may pass between said members, speed-balancing means interposed between said branches and one of said members, whereby the ratio between the speeds transmitted by the various branches will be predetermined, and shock absorbing means in the path of the transmitted power and interposed between said speed-balancing means and the last-mentioned member whereby the magnitude of transmitted shocks will be kept below a predetermined maximum.

3. A power transmission system for transferring power between a pair of torque-transmitting members, said system comprising a plurality of branches, each comprising races and rolling bodies in adhesive driving contact and a carrier for said rolling bodies, along which power may pass between said members, speed-balancing means interposed between said branches and one of said members, whereby the ratio between the speeds transmitted by the various branches will be predetermined, and resilient means in the path of the transmitted power and interposed between said speed-balancing means and the last-mentioned member.

4. A power transmission system for transferring power between a pair of torque-transmitting members, said system comprising a plurality of branches, each comprising races and rolling bodies in adhesive driving contact and a carrier for said rolling bodies, along which power may pass between said members, speed-balancing means interposed between said branches and one of said members, whereby the ratio between the speeds transmitted by the various branches will be predetermined, resilient means in the path of the transmitted power and interposed between said speed-balancing means and the last-mentioned member, and shock-absorbing means for yieldingly retaining said carrier in a substantially fixed position.

5. In a power transmission system for transmitting power from a rotary driving to a rotary driven member, a planetary type differential system comprising planetary rolling bodies and a carrier for the same, and a pair of sun elements in opposed relation to said planetary rolling bodies, said carrier being operatively connected to one of said members, and each sun element being connected to one side of transmission mechanism comprising relatively movable elements, both of said mechanisms having their other sides connected to the other of said members in such a manner as to prevent relative rotation thereof and so that the power flow through said mechanisms is in the same direction in relation to said members, and a resilient connecting member interposed between said carrier and the member to which it is connected, whereby it is adapted for limited displacement relatively thereto.

6. A power transmission system for transferring power between a pair of torque-transmitting members, said system comprising a plurality of branches along which power may pass between said members, torque balancing means interposed between said branches and one of said members, whereby the ratio between the torques transmitted by the various branches will be predetermined, and resilient means in the path of the transmitted power and interposed between said torque-balancing means and the last-mentioned member for modifying the transmitted torques.

7. A power transmission system for transferring power between a pair of torque-transmitting members, said system comprising a plurality of branches along which power may pass between said members, torque-balancing means interposed between said branches and one of said members, whereby the ratio between the torques transmitted by the various branches will be predetermined, and shock absorbing means in the path of the transmitted power and interposed between said torque-balancing means and the last-mentioned member whereby the magnitude of transmitted shocks will be kept below a predetermined maximum.

8. A power transmission system for transferring power between a pair of torque-transmitting members, said system comprising a plurality of branches, each comprising races and rolling bodies in adhesive driving contact and a carrier for said rolling bodies, along which power may pass between said members, torque-balancing means interposed between said branches and one of said members, whereby the ratio between the torques transmitted by the various branches will be predetermined, and resilient means in the path of the transmitted power and interposed between said torque-balancing means and the last-mentioned member.

9. A power transmission system for transferring power between a pair of torque-transmitting members, said system comprising a plurality of branches, each comprising race and rolling bodies in adhesive driving contact and a carrier for said rolling bodies, along which power may pass between said members, torque-balancing means interposed between said branches and one of said members, whereby the ratio between the torques transmitted by the various branches will be predetermined, resilient means in the path of the transmitted power and interposed between said torque-balancing means and the last-mentioned member, and shock-absorbing means for yieldingly retaining said carrier in a substantial fixed position.

10. In a device of the character described, in combination, a driving shaft and a driven shaft and means for transmitting the torque from the former to the latter, said means comprising at least two transmission units, each unit comprising races and rolling bodies, the outer race of each of said units being in driving relationship to the driving shaft whereby the torque of the driving shaft is delivered in divided parts to said units, and the inner race of each of said units being driven in the same direction, the transmission units being substantially duplicates whereby the division of the torques between the units will be substantially equal, and equalizing means in driving relation to the units for eliminating any inequalities that may develop in the division of the torque between the units, said means comprising instrumentalities revoluble about two distinct axes.

11. In a device of the character described, in combination, a driving shaft and a driven shaft and means for transmitting the torque from the former to the latter, said means comprising two transmission units, each unit comprising races and rolling bodies, the outer race of each of said units being in driving relationship to the driving shaft whereby the torque of the driving shaft is delivered partly to one unit and partly to the other unit, and the inner race of each of said units being driven in the same direction, the transmission units being substantially duplicates whereby the division of the torques between the two units will be substantially equal, and equalizing means in driving relation to the units for eliminating any inequalities that may develop in the division of the torque between the two units by an adjustment of the division of the torque so as to cause the torque to be equally divided between the units and for causing the equal torques transmitted through the units to be reunited and delivered to the driven member.

12. In combination with mechanism as defined in claim 11, means associated with the rolling bodies for simultaneously varying the ratio of transmission of all the units in the same direction and to the same extent.

13. In a device of the character described, in combination, a driving shaft and a driven shaft and means for transmitting the torque from the former to the latter, said means comprising transmission units, each unit comprising races and rolling bodies, the outer race of each of said units being in driving relationship to the driving shaft whereby the torque of the driving shaft is delivered in divided parts through said units, and the inner race of each of said units being driven in the same direction, means for simultaneously varying the ratio of transmission of all the units in the same direction and to the same extent, and equalizing means comprising planetary elements in driving relation to the units for eliminating any inequalities that may develop in the division of the torque between the units.

14. In a device of the character described, in combination, a driving shaft and a driven shaft and means for transmitting the torque from the former to the latter, said means comprising two transmission units, each unit comprising races and rolling bodies, a race of each of said units being in driving relationship to the driving shaft whereby the torque of the driving shaft is delivered in dividing parts through the said units, and the other races of each of said units being driven in the same direction, and mechanism comprising rolling bodies interposed between the said units, each of said bodies being in contact with adjacent races of the said units, said units and said mechanism being in axial alignment.

15. In a device of the character described, in combination, a driving shaft and a driven shaft and means for transmitting the torque from the former to the latter, said means comprising a plurality of transmission units, each unit comprising races and rolling bodies, a race of each of said units being in driving relationship to the driving shaft whereby the torque of the driving shaft is delivered in divided parts through the said units, and the other race of each of said units being driven in the same direction independently of each other so as to be capable of relative rotation, and a mechanism comprising rolling bodies in rolling contact with one of said independently driven races, said units and said mechanism being in axial alignment.

16. In a power transmission system for transmitting power from a rotary driving to a rotary driven member, a planetary type differential system comprising planetary rolling bodies and a carrier for the same, and a pair of sun elements in opposed relation to said planetary rolling bodies, said carrier being operatively connected to one of said members, and each sun element being connected to one side of transmission mechanism comprising relatively movable elements, both of said mechanisms having their other sides connected to the other of said members in such a manner as to prevent relative rotation thereof and so that the power flow through said mechanism is in the same direction in relation to said members and each of the transmission mechanisms comprising a pair of races and rollers therebetween and in adhesive rolling contact therewith so as to transmit power therebetween, and one of said races being operatively connected to one of the sun elements and the other one of said members, and said rollers being mounted so as to have their plane of rotation shiftable in relation to said races for the purpose of varying the speed ratio of said transmission mechanism.

17. In a power transmission system for transmitting power from a rotary driving to a rotary driven member, a planetary type differential system comprising planetary rolling bodies and a carrier for the same, and a pair of sun elements in opposed relation to said planetary rolling bodies, said carrier being operatively connected to one of said members, and each sun element being connected to one side of transmission mechanism comprising relatively movable elements, both of said mechanisms having their other sides connected to the other of said members in such a manner as to prevent relative rotation thereof and so that the power flow through said mechanism is in the same direction in relation to said members and each of the transmission mechanisms comprising a pair of races and rollers therebetween and in adhesive rolling contact therewith so as to transmit power therebetween, and one of said races being operatively connected to one of the sun elements and the other one of said members, and at least one of the races of each of said mechanisms being self-aligning about a point on its axis of rotation.

18. In a power transmission system for transmitting power from a rotary driving to a rotary driven member, a planetary type differential system comprising planetary rolling bodies and a carrier for the same, and a pair of sun elements in opposed relation to said planetary rolling bodies, said carrier being operatively connected to one of said members, and each sun element being connected to one side of transmission mechanism comprising relatively movable elements, both of said mechanisms having their other sides connected to the other of said members in such a manner as to prevent relative rotation thereof and so that the power flow through said mechanism is in the same direction in relation to said members and each of the transmission mechanisms comprising a pair of races and rollers therebetween and in adhesive rolling contact therewith so as to transmit power therebetween, and one of said races being operatively connected to one of the sun elements and the other one of said members, and a torque-loading device adapted to generate axial pressures proportional to the torque transmitted, so as to maintain adhesive contact between said races and said rollers, associated with each of said mechanisms.

19. A power transmission system as in claim 16 in which said torque loading devices are positioned so that their axial pressures oppose each other.

20. A power transmission system as in claim 16 in which said planetary system and said transmission mechanisms are so positioned in relation to said torque loading devices that the axial pressures generated thereby oppose each other and serve to maintain adhesive contact between the elements of said planetary system and said mechanisms.

21. In a power transmission system for transmitting power from a rotary driving to a rotary driven member, a planetary type differential system comprising planetary rolling bodies and a carrier for the same, and a pair of sun elements in opposed relation to said planetary rolling bodies, said carrier being operatively connected to one of said members, and each sun element being connected to one side of transmission mechanism comprising relatively movable elements, both of said mechanisms having their other sides connected to the other of said members in such a manner as to prevent relative rotation thereof and so that the power flow through said mechanism is in the same direction in relation to said members and each of the transmission mechanisms comprising a pair of races and rollers therebetween and in adhesive rolling contact therewith so as to transmit power therebetween, and one of said races being operatively connected to one of the sun elements and the other one of said members, and said rollers being rotatably positioned within a carrier element resiliently mounted in relation to the frame of the transmission and thereby adapted for limited displacement from a normal position.

22. A duplex friction race and roller transmission mechanism comprising two sets of driving and driven races, and interposed rollers, corresponding races of each set being angularly movable with respect to one another, and a differential power transmitting means in engagement with a race in one set and the corresponding race of the other set.

23. A duplex friction race and roller power transmission mechanism comprising two sets of coaxial races and intermediate rollers, a differential mechanism in power transmitting engagement with a race in one set and the corresponding race in the other and means for permitting differential angular movement of the other races.

24. A duplex friction race and roller power transmission mechanism, comprising two axially alined end races in driving connection with each other, one of said end races being capable of limited axial and angular movement with respect to the other, a torque responsive device rendered effective by said relative angular movement for forcing said end races toward each other, two rotatable intermediate races capable of relative angular motion, two sets of rollers between said end races and intermediate races, and a differential mechanism in power transmitting engagement with said two intermediate races.

25. A duplex friction race and roller power transmission mechanism comprising a shaft, a pair of end races in driving connection with the shaft, one of said end races being capable of a limited axial and angular movement relative to the shaft, torque responsive means coacting with shaft and race capable of angular movement relative to the shaft for forcing said end races toward each other, two intermediate races rotatable about the shaft axis and capable of angular movement relative to one another, two sets of power transmission rollers between the intermediate and end races, and a differential mechanism in power transmitting engagement with said two intermediate races.

26. A duplex friction race and roller power transmission mechanism comprising intermediate adjacent, coaxial races, a differential mechanism in power transmitting engagement with said races, a pair of end races capable of differential angular movement, two sets of rollers in power transmitting engagement with said intermediate and end races, a member disposed between the intermediate races rotatable around the race axis, differential mechanism carried by said member disposed between and in power transmitting engagement with the intermediate races.

27. A duplex friction race and roller power transmission mechanism comprising intermediate adjacent, coaxial races, a differential mechanism in power transmitting engagement with said races, a pair of end races capable of differential angular movement, two sets of rollers in power transmitting engagement with said intermediate and end races, a rotatable member coaxial with and disposed between said intermediate races, and differential mechanism comprising rolling bodies carried by said member disposed between the intermediate races, said rolling bodies being in rolling engagement with both races.

28. In combination, a shaft, two similar transmissions of identical size mounted coaxially with reference to each other and with reference to the shaft, each transmission system comprising races and rollers in adhesive contact with the races and a carrier for the said rollers, a differential interposed between the two adjacent races of the two systems, comprising planetary wheels in engagement with said adjacent races and a carrier for said wheels, and a member coaxially positioned with reference to the shaft and connecting the carriers of the rollers of the two transmissions.

29. In combination, a shaft, two substantially identical transmissions mounted coaxially with reference to each other and with reference to the shaft, each transmission system comprising races and rollers in adhesive contact with the races and a carrier for said rollers, a differential interposed between the two adjacent races of the two systems, comprising planetary wheels in engagement with said adjacent races and a carrier for said wheels, said last named carrier having a central opening coaxial with said shaft, and a sleeve passing through the central opening of said last named carrier and connecting the first said carriers of the rollers of the two transmissions.

30. In combination, a shaft, two transmissions of identical size and similar structure mounted coaxially with reference to each other and with reference to the shaft, each transmission comprising races and rollers in adhesive contact therewith and a carrier for said rollers, a differential gear means interposed between the two adjacent races of the two transmissions, comprising planetary wheels and a carrier therefor, and a sleeve coaxially positioned with reference to the shaft and connecting the carriers for the rollers of the two transmissions and serving as a support for the carrier of the differential gear means.

31. In combination, a shaft, two substantially identical friction transmissions mounted coaxially with reference to each other and with reference to the shaft, each transmission comprising races and rollers mounted for ratio changing adjustment said races having central bores through which said shaft passes, a differential interposed between the two adjacent races of the two systems, comprising planetary wheels in engagement with said adjacent races and a carrier for said wheels, and a support for journalling the carrier of the planetary wheels of the differential, said support comprising an element surrounding the shaft and extending through the bores of the said two adjacent races.

32. In combination, two substantially identical transmissions with infinitely variable ratio mounted upon a shaft, each transmission comprising a pair of races and adjustable rollers and means to change the ratio, a differential gear means interposed between the two adjacent races of the two transmissions comprising planetary wheels and a carrier therefor, and a tubular member for rotatably journalling the last named carrier, said member extending along the shaft and supporting the said ratio changing means.

33. In combination, two shafts, two similar transmission systems mounted upon one of said shafts and each comprising a pair of races, a roller carrier and several rollers in driving contact with said races, a differential gear means interposed between the two adjacent races of the two systems and comprising a rotatable element coaxial with said first shaft and adapted to cooperate with a rotatable member mounted upon the other of said shafts to transmit power between said coaxial element and said other shaft, and a support for said rotatable coaxial element.

34. In a friction transmission, the combination of a drive shaft; outer races drivably connected to said shaft; inner races coaxially positioned between said outer races; power transmitting rollers mounted between each of said inner and outer races; means for causing a tilting movement of said rollers to change the driving ratio between said outer and inner races; journalling means for said inner races so that each of said inner races is rotatable independently with respect to the other inner race; means to impose an axial load upon said outer races, said rollers and said inner races whereby said inner races tend to move toward each other; and a set of rolling bodies positioned between the said inner races and constructed and arranged to support the thrust between said inner races.

35. In a variable speed transmission, the combination of driving means, driven means, a shaft, two pairs of discs with toroidal raceways coaxially positioned for rotation around said shaft, one of said pair of discs being driven by said driving means, the other pair of said discs journalled to be rotatable independently with respect to each other, tiltable friction rollers mounted between said discs to drive the second named discs from said first named discs, and mechanism constructed and arranged to transmit motion from said second named discs to said driven means.

36. In a variable speed transmission, the combination of a shaft, two outer and two inner discs having toroidal raceways opposing each other and coaxial with said shaft, tiltable rollers mounted between said toroidal raceways, journalling means for the inner discs to make said inner discs independently rotatable with respect to each other, a trust supporting device comprising rolling bodies interposed between said inner discs, and a pair of torque loading devices for imposing an axial thrust upon said outer discs.

ALAIN MADLÉ.